United States Patent
Rembold et al.

(10) Patent No.: US 6,397,819 B1
(45) Date of Patent: Jun. 4, 2002

(54) FUEL SUPPLY SYSTEM IN AN INTERNAL COMBUSTION ENGINE

(75) Inventors: Helmut Rembold, Stuttgart; Erwin Grommes, Obersulm; Hermann Buchwald, Ilsfeld; Albrecht Baessler, Korntal-Muenchingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/462,830

(22) PCT Filed: Feb. 10, 1999

(86) PCT No.: PCT/DE99/00352

§ 371 (c)(1),
(2), (4) Date: Jan. 14, 2000

(87) PCT Pub. No.: WO99/61782

PCT Pub. Date: Dec. 2, 1999

(30) Foreign Application Priority Data

May 27, 1998 (DE) .......................................... 198 23 639

(51) Int. Cl.[7] ............................................... F02M 33/04
(52) U.S. Cl. ....................................... 123/456; 123/457
(58) Field of Search .................................. 123/456, 468, 123/469, 457

(56) References Cited

U.S. PATENT DOCUMENTS

| | | | | |
|---|---|---|---|---|
| 5,207,203 A | * | 5/1993 | Wagner et al. | 123/456 |
| 5,676,114 A | * | 10/1997 | Tarr et al. | 123/456 |
| 6,000,380 A | * | 12/1999 | Weisbarth | 123/456 |

* cited by examiner

*Primary Examiner*—Thomas N. Moulis
(74) *Attorney, Agent, or Firm*—Ronald E. Greigg

(57) ABSTRACT

In fuel delivery systems with two fuel pumps connected in series, two fuel distribution strips are provided in V-engines. Before now in this connection, there was the problem that in order to regulate the pressure in the two fuel distribution strips, a considerably high cost was required and/or the regulation of the pressure could not take place with the desired quality.

In the fuel delivery system proposed here, a favorable pressure regulation in the two fuel distribution strips (21, 22) can be achieved by means of the one pressure control valve (30), with a minimum of rigid lines to be laid.

The fuel delivery system is provided for an internal combustion engine of a vehicle.

20 Claims, 1 Drawing Sheet

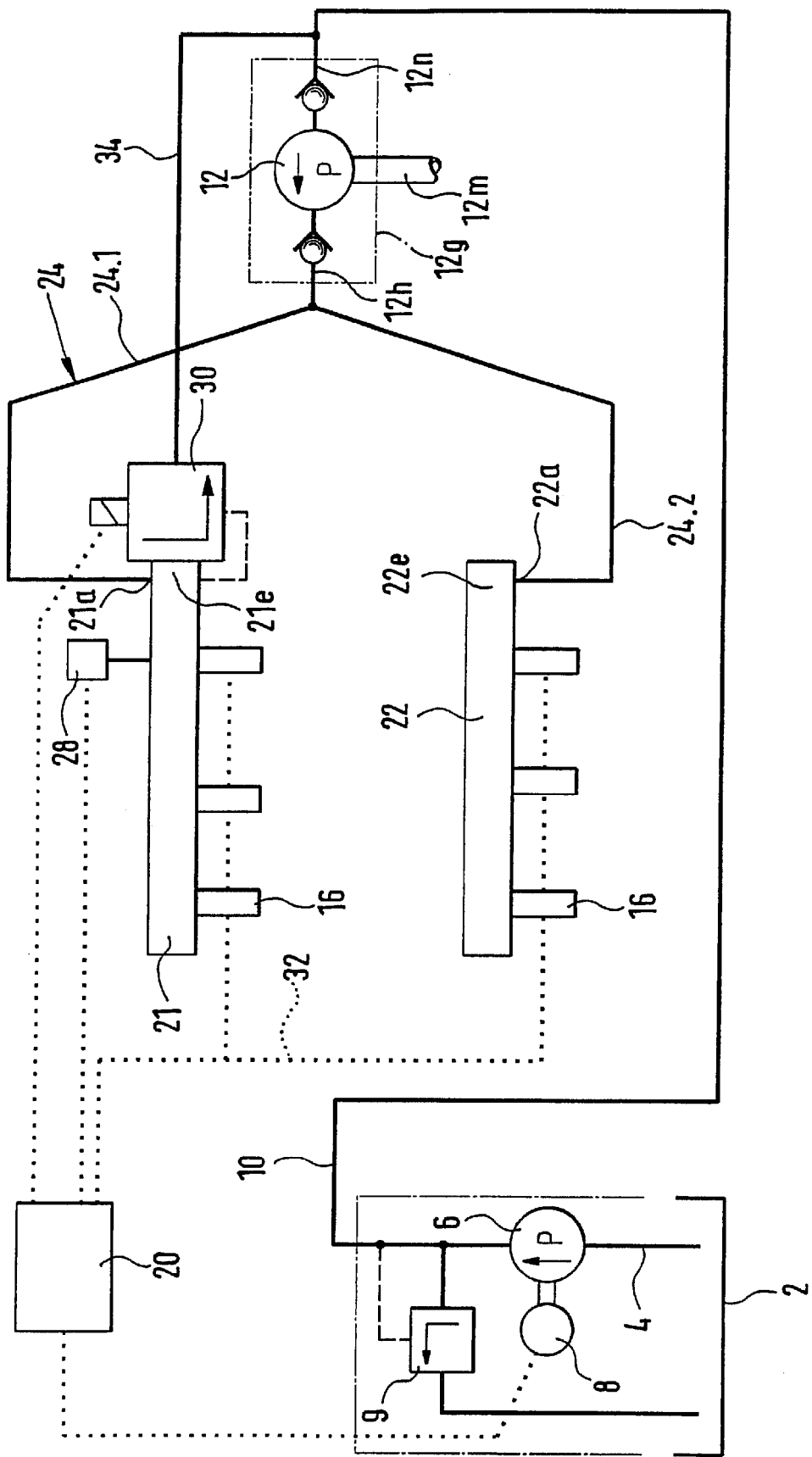

FUEL SUPPLY SYSTEM IN AN INTERNAL COMBUSTION ENGINE

PRIOR ART

The invention is based on a fuel delivery system for supplying fuel for an internal combustion engine.

In the prior art there have been fuel delivery systems in which a first fuel pump supplies fuel from a fuel tank to a second fuel pump by way of a fuel connection. The second fuel pump in turn supplies the fuel to two fuel distribution strips. A number of fuel valves are connected to each of the fuel distribution strips. Usually, the number of fuel valves is equal to the number of cylinders of the engine. The fuel delivery system is constructed so that the fuel valves each inject the fuel directly into a respective combustion chamber of the engine. The operation of this fuel delivery system requires a high pressure at the inlet of the fuel valves and therefore in the fuel distribution strips.

In an internal combustion engine in which there are two rows of cylinders disposed in a V-shape in relation to one another, a fuel distribution strip is provided for each row of cylinders.

Because the fuel valves are connected directly to the fuel distribution strips, it is important that precisely the same pressure prevail in each of the two fuel distribution strips. It is necessary to have the capacity to very precisely and rapidly adapt this pressure to the respective operating condition of the engine. In previously known fuel delivery systems, these problems could not be satisfactorily solved and up to this point, the expense for solving these problems has been considerably high.

The pressure of the fuel in the fuel distribution strips can be controlled by means of pressure control valves. Up to now, the cost for controlling the pressure in the pressure distribution strips has been considerably high and/or quite imprecise and/or it has turned out that the location provided for the pressure control valve has a negative influence on the service life and/or the regulating quality of the pressure control valve. Previously, the prevailing opinion held that a considerably high cost had to be incurred in order to precisely regulate the pressure in the fuel distribution strips or if incurring this high cost was undesirable, a lower quality of pressure control, in particular divergent pressures in the fuel distribution strips, had to be accepted.

In some known fuel delivery systems, an extremely long high-pressure line had to be installed in order to be able to control the pressure in the two fuel distribution strips to a fairly precise degree. This increased the manufacturing cost enormously.

Because a slight relative movement between the two fuel distribution strips cannot be completely prevented, there are fuel delivery systems in which the connection between the two fuel distribution strips takes place by way of high-pressure lines comprised of a flexible, preferably cloth-reinforced, rubber elastic material. Because of the high-pressure and the aggressiveness of the fuel in the high-pressure lines, however, there have not yet been reasonably priced, sufficiently elastic high-pressure lines with which a sufficient flexibility between the two fuel distribution strips could be achieved, which is why a direct high-pressure line as a direct connection between the two fuel distribution strips has not been completely satisfactory in practical application for reasons of tightness, service life, function, and cost.

ADVANTAGES OF THE INVENTION

The fuel delivery system according to the invention, has an advantage that the pressure in the fuel distribution strips can be very precisely adjusted, particularly with a high regulating quality. It achieves the fact that the pressure can be very rapidly and precisely adapted with changing operating conditions of the internal combustion engine. The manufacturing cost as well as the cost for subsequent operation and later maintenance work is advantageously particularly low because the one pressure control valve can also be used to regulate the pressure of the fuel in the second fuel distribution strip and, if necessary, in other fuel distribution strips. Advantageously, only a very few hydraulic and electric lines have to be laid.

Since the pressure control valve is provided in the vicinity of the first fuel distribution strip, and is therefore sufficiently removed from the second fuel pump, the advantage is attained that inevitable pressure pulsations caused by the second fuel pump cannot lead to an impairment of the regulation quality of the pressure control valve and cannot lead to a shortening of the service life or to an impairment of the regulation quality of the pressure control valve over the course of time. Particularly since the pressure control valve is provided immediately in the vicinity of the fuel distribution strip, pressure pulsations are advantageously also smoothed by means of the volume in the fuel distribution strip, which advantageously has a favorable influence on the pressure adjustment quality of the pressure control valve.

In particular, because the pressure control valve in the fuel distribution strip is disposed in the vicinity of the inlet connection of the fuel distribution strip, this results—in a particularly simple manner—in the fact that the pressure in the second fuel distribution strip can also be controlled in a sufficiently precise manner with only the one pressure control valve.

Advantageously, an immediate, direct, short connection between the two fuel distribution strips can be eliminated which would be problematic because of the high-pressures, sharply fluctuating temperatures, and dynamic stresses due to pressure pulsations and relative oscillations between the two fuel distribution strips.

Advantageous improvements and updates of the fuel delivery system are possible by means of the measures taken in the disclosure.

If the fuel line receiving the fuel flowing out from the pressure control valve is laid so that it feeds into the fuel connection, preferably directly at the low-pressure side of the second fuel pump, the advantage is attained that on the whole, very little line length has to be laid.

Providing the inlet connections of the fuel distribution strips at their ends can result in the advantageous fact that only one very short high-pressure line has to be laid between the second fuel pump and the fuel distribution strips.

If the high-pressure line leading from the second fuel pump to the fuel distribution strips is split into two high-pressure line branches, wherein the one branch leads to the one fuel distribution strip and the other branch leads to the other fuel distribution strip, then both fuel distribution strips can be connected in a simple manner wherein the advantage is attained that no direct connection has to be produced between the two fuel distribution strips, which would be problematic because a certain relative mobility between the two fuel distribution strips must be assured due to manufacture tolerances, temperature fluctuations, and oscillations. Another particular advantage is that a tube material can be used for the high-pressure line which is relatively rigid and inexpensive to produce, and despite this fact, the relative mobility between the two fuel distribution strips remains assured. In particular, a flexible hose comprised of cloth and/or rubber and/or plastic does not have to be used.

If both high-pressure line branches are the same length, then the advantage of a particularly favorable adjustability and regulation quality of the pressure in the two fuel distribution strips is achieved, even with the use of only the one pressure control valve in the first fuel distribution strip.

If the high-pressure line splits into the two high-pressure line branches relatively soon after the second fuel pump or even inside the second fuel pump, then the advantage of a particularly sufficient relative mobility between two fuel distribution strips is attained, even with the use of a particularly rigid tube material for the high-pressure line.

BRIEF DESCRIPTION OF THE DRAWING

A selected, particularly advantageous exemplary embodiment of the invention is shown in a simplified fashion in the drawing and will be explained in detail in the subsequent description.

DESCRIPTION OF THE EXEMPLARY EMBODIMENT

The fuel delivery system according to the invention for metering fuel for an internal combustion engine can be used in various types of internal combustion engines. For example, the engine is a gasoline engine, with internal mixture formation and external ignition, wherein the engine can be provided with a reciprocating piston (reciprocating-piston engine) or with a rotatably supported piston (rotary piston engine). For example, the engine is a hybrid engine. With this engine, which has stratified charging, the fuel-air mixture in the combustion chamber is enriched in the vicinity of the spark plug so that a reliable ignition is assured; the combustion in the center, however, takes place with a very leaned mixture.

The gas exchange in the combustion chamber of the engine can, for example, take place in accordance with the four-stroke process or the two-stroke process. Gas exchange valves (inlet valves and outlet valves) can be provided in a known manner in order to control the gas exchange in the combustion chamber of the engine. The engine is preferably embodied so that the fuel valves inject the fuel directly into the combustion chamber of the engine. The power of the engine is preferably controlled by means of controlling the quantity of fuel supplied to the combustion chamber. However, the provision can also be made that the air supplied to the combustion chamber for the combustion of the fuel is controlled with a throttle valve. The power to be supplied by the engine can also be controlled by way of adjusting the throttle valve.

For example, the engine has a number of cylinders, wherein part of the cylinders are disposed in a first row and part of the cylinders are disposed in a second row. When viewed from the end face of the engine, the cylinders are disposed, for example, in a V-shape in relation to one another. Preferably, each cylinder is provided with a respective fuel valve. Usually two fuel distribution strips are provided for the engine. In some engines, there can also be more than two fuel distribution strips. At least one fuel valve is connected to each fuel distribution strip. Normally, two, three, four, five, or more fuel valves are connected to each fuel distribution strip.

In order to avoid a description that is needlessly excessive, the following description of the exemplary embodiment will be limited to a reciprocating-piston engine with six cylinders, each with a respective fuel valve, wherein the six fuel valves inject the fuel, usually gasoline, directly into the combustion chamber of the engine. The power of the engine is controlled by controlling the quantity of fuel injected. When idling and in the lower partial load range, a stratified charging takes place, with fuel enrichment in the vicinity of the spark plug. In this connection, the mixture is very lean outside this region around the spark plug. When at full load or in the upper partial load range, the attempt is made to achieve a homogeneous distribution between fuel and air in the entire combustion chamber.

The sole FIGURE schematically represents a fuel tank 2, a suction line 4, a first fuel pump 6, an electric motor 8, a pressure limiting valve 9, a fuel connection 10, a second fuel pump 12, six fuel valves 16, and an electric or electronic control unit 20. In professional circles, the fuel valves 16 are frequently referred to as injection valves or injectors. The fuel connection 10 leads from the pressure side of the first fuel pump 6 to the low-pressure side $12n$ of the second fuel pump 12.

A line branches from the fuel connection 10 and can convey the fuel from the fuel connection 10 directly back into the fuel tank 2. The pressure limiting valve 9 in this line assures that the supply pressure in the fuel connection 10 does not exceed a particular value.

The first fuel pump 6 is driven by the electric motor 8. The first fuel pump 6, the electric motor 8, and the pressure limiting valve 9 are disposed in the vicinity of the fuel tank 2. These parts are preferably disposed externally on the fuel tank 2 or are disposed inside the fuel tank 2, which is symbolically depicted by means of a dot-and-dash line. The first fuel pump 6, the electric motor 8, and the pressure limiting valve 9 constitute a compact structural unit and can be referred to as the delivery module.

A mechanical transmission means $12m$ couples the second fuel pump 12 mechanically to a drive shaft, not shown, of the engine. For example, the drive shaft is a crankshaft of the engine.

The second fuel pump 12 is disposed inside a pump housing $12g$, which is symbolically indicated with dot-and-dash lines. The second fuel pump 12 has a low-pressure side $12n$ and a high-pressure side $12h$.

The fuel delivery system of the engine includes a first fuel distribution strip 21 and a second fuel distribution strip 22. The first fuel distribution strip 21 has an inlet connection $21a$ and the fuel distribution strip 22 has an inlet connection $22a$. The inlet connection $21a$ is provided in the vicinity of the end $21e$ of the first fuel distribution strip 21 close to the second fuel pump 12. The inlet connection $21a$ is disposed in the vicinity of the end $21e$, for example on a side wall of the fuel distribution strip 21 or at the end $21e$ of the fuel distribution strip 21. The inlet connection $22a$ of the second fuel distribution strip 22 is also disposed at the end $22e$ of the second fuel distribution strip 22 closest to the second fuel pump 12.

A high-pressure line 24 leads from the high-pressure side $12h$ of the second fuel pump 12 to the inlet connection $21a$ of the first fuel distribution strip 21 and to the inlet connection $22a$ of the second fuel distribution strip 22. Downstream, soon after the second fuel pump 12, the high-pressure line 24 splits into a first high-pressure line branch 24.1 and a second high-pressure line branch 24.2. The first high-pressure line branch 24.1 conveys the fuel from the second fuel pump 12 into the fuel distribution strip 21 by means of the inlet connection $21a$, and the second high-pressure line branch 24.2 conveys the fuel from the second fuel pump 12 into the second fuel distribution strip 22 by means of the inlet connection 22a.

It should be noted that in contrast to the preferred, selected exemplary embodiment, the fuel delivery system can be modified so that two connections are provided on the pump housing 12g on the high-pressure side 12h. In this case, the high-pressure line 24 already splits into the first high-pressure line branch 24.1 and the second high-pressure line branch 24.2 inside the pump housing 12g.

The high-pressure line 24 and the high-pressure line branches 24.1 and 24.2 are preferably comprised of a tube, wherein preferably metal can be used as a material for the tube. This achieves a reliable, fuel resistant, high-pressure resistant connection that is inexpensive to produce. The fact that the high-pressure line 24 splits into the two high-pressure line branches 24.1 and 24.2 inside the pump housing 12g or relatively soon after the second fuel pump 12, but at least with a sufficient distance from the fuel distribution strips 21, 22, results in the fact that the two fuel distribution strips 21 and 22 can move slightly in relation to each other without impermissible stresses occurring inside the high-pressure line 24. The high-pressure line 24 splits into the two high-pressure line branches 24.1 and 24.2 well in advance of the two fuel distribution strips 21 and 22 so that relative movements occurring between the two fuel distribution strips 21 and 22 do not lead to impermissibly high stresses in the high-pressure line even with the use of fuel-resistant, rigid tube material that is inexpensive to produce.

The two high-pressure line branches 24.1 and 24.2 of the high-pressure line 24 are preferably equal in length. This results in the fact that even with dynamic, greatly changing pressure conditions, the pressure change inside the two fuel distribution strips 21 and 22 occurs at the same time and to the same degree. As a result, the quality of the pressure regulation inside the fuel distribution strips 21 and 22 can be controlled in a particularly favorable and simple manner.

A pressure sensor 28 is provided in the first fuel distribution strip 21 to detect the pressure in the fuel distribution strip 21. The pressure sensor 28 supplies electrical signals to the control unit 20 depending on the pressure in the fuel distribution strip 21. A pressure control valve 30 is provided at the end 21e of the first fuel distribution strip 21 oriented toward the second fuel pump 12. The pressure control valve 30 is disposed in the immediate vicinity of the inlet connection 21a of the first fuel distribution strip 21. The pressure control valve 30 is preferably flange-mounted directly onto the first fuel distribution strip 21. However, the pressure control valve 30 can also be integrated directly into the fuel distribution strip 21. The pressure control valve 30 can be electrically controlled; it receives its control signals from the control unit 20.

The electric motor 8, the fuel valves 16, the pressure sensor 28, and the pressure control valve 30 are connected to the control unit 20 via electric lines 32. The electric line 32 between the fuel valves 16 and the control unit 20 is embodied so that the control unit 20 can control each of the fuel valves 16 separately. For the sake of better differentiation from the other non-electric lines, the electric lines 32 are represented with dotted lines.

A fuel line 34 leads from the pressure control valve 30 into the fuel connection 10. The fuel line 34 preferably feeds into the fuel connection 10 in the immediate vicinity of the low-pressure side 12n of the second fuel pump 12. As a result, the fuel line 34 can be embodied as relatively short.

Depending on the operating conditions of the engine, the control unit 20 can directly influence the pressure in the fuel distribution strip 21 by way of the electrically controllable pressure control valve 30. Because the pressure control valve 30 is disposed directly in the vicinity of the inlet connection 21a of the first fuel distribution strip 21, upon triggering of the pressure control valve 30, the pressure adjusted by the pressure control valve 30 is also transmitted into the second fuel distribution strip 22 along the shortest possible path. Because the two fuel distribution strips 21 and 22 are connected to each other by way of the two high-pressure line branches 24.1 and 24.2, there is no longer the need for an immediate, direct connecting line between the two fuel distribution strips 21 and 22, which would have the disadvantage that in the event of relative movements between the two fuel distribution strips 21 and 22, which can never be completely prevented, impermissibly high stresses would be produced in the direct connecting line or a flexible hose would have to be used as a connecting line which would have the disadvantage that if materials available on the market were used, the flexible connecting hose would not be fatigue-resistant, in particular due to the use of fuel and due to the high pressures and relatively large temperature fluctuations. During the normal operating state, the pressure in the pressure line 24 can be up to 100 bar, for example, which corresponds to 10 MPa.

The fuel valves 16 are preferably built rigidly into the cylinder head of the engine. The attachment of the fuel valves 16 to each of the fuel distribution strips 21 and 22 takes place by way of a rigid connection that is sealed with a sealing ring. This produces a relatively rigid, inflexible connection between the cylinder heads of the engine and the fuel distribution strips 21 and 22. When there are temperature changes and during the attachment of the fuel delivery system to the engine, relative movements take place between the two fuel distribution strips 21 and 22, which must be taken into account in order to prevent leaks inside the fuel delivery system. The relative movements to be expected can be offset with no trouble by means of the proposed division of the high-pressure line 24 into the two high-pressure line branches 24.1 and 24.2 with sufficient line length upstream before the fuel distribution strips 21, 22.

Because the second fuel pump 12 is disposed directly in the vicinity of the engine, the high-pressure line 24 and the two high-pressure line branches 24.1 and 24.2 can be kept relatively short, particularly when the inlet connections 21a and 22a are disposed at the ends 21e and 22e of the fuel distribution strips 21 and 22 oriented toward the second fuel pump 12. If the fuel delivery system is embodied in the proposed manner, then the pressure of the fuel in the two fuel distribution strips 21 and 22 can be very precisely controlled with only the one pressure control valve 30. And it is not necessary that the fuel distribution strips 21, 22 be flushed by the fuel; in particular, the fuel distribution strips 21, 22 do not have to be provided with a return connection, which can keep the number of required lines to a minimum. And in particular, no additional connection is required to return fuel from the second fuel distribution strip 22 into the fuel connection 10 or back into the fuel tank 2.

The foregoing relates to a preferred exemplary embodiments of the invention, it being understood that other variants and embodiments thereof are possible within the spirit and scope of the invention, the latter being defined by the appended claims.

What is claimed is:

1. The fuel delivery system for supplying fuel for an internal combustion engine, comprising a fuel tank, a first fuel pump (6), a second fuel pump (12), a first fuel distribution strip (21) with an inlet connection (21a), at least one fuel valve (16) connected to the first fuel distribution strip (21), at least one second fuel distribution strip (22) with an inlet connection (22a), at least one fuel valve (16) connected to the second fuel distribution strip (22), and a high-pressure line (24) via which the second fuel pump (12) is connected to the inlet connection (21a) of the first fuel distribution strip (21) and to the inlet connection (22a) of the second fuel distribution strip (22), the first fuel pump (6) supplies fuel from the fuel tank into a fuel connection (10) and the second fuel pump (12) supplies fuel from the fuel connection (10) by way of the high-pressure line (24) to the first fuel distribution strip (21) and to the second fuel distribution strip (22), a pressure control valve (30) is connected with the first fuel distribution strip (21) in the vicinity of the inlet connection (21a) and controls a high pressure in the first fuel distribution strip (21a) and at least in the second fuel distribution strip (22).

2. The fuel delivery system according to claim 1, which includes a fuel line (34), the fuel line (34) is connected with the pressure control valve (30) and receives fuel from the pressure control valve (30), wherein the fuel line (34) feeds fuel into the fuel connection (10) and diverts the fuel received into the fuel connection (10).

3. The fuel delivery system according to claim 1, in which the inlet connection (21a) of the first fuel distribution strip (21) is provided at an end (21e) of the first fuel distribution strip (21) and the inlet connection (22a) of the second fuel distribution strip (22) is provided at an end (22e) of the second fuel distribution strip (22).

4. The fuel delivery system according to claim 2, in which the inlet connection (21a) of the first fuel distribution strip (21) is provided at an end (21e) of the first fuel distribution strip (21) and the inlet connection (22a) of the second fuel distribution strip (22) is provided at an end (22e) of the second fuel distribution strip (22).

5. The fuel delivery system according to claim 1, in which the high-pressure line (24) is split into a first high-pressure line branch (24.1) that leads from the second fuel pump (12) to the first fuel distribution strip (21), and a second high-pressure line branch (24.2) that leads from the second fuel pump (12) to the second fuel distribution strip (22).

6. The fuel delivery system according to claim 2, in which the high-pressure line (24) is split into a first high-pressure line branch (24.1) that leads from the second fuel pump (12) to the first fuel distribution strip (21), and a second high-pressure line branch (24.2) that leads from the second fuel pump (12) to the second fuel distribution strip (22).

7. The fuel delivery system according to claim 3, in which the high-pressure line (24) is split into a first high-pressure line branch (24.1) that leads from the second fuel pump (12) to the first fuel distribution strip (21), and a second high-pressure line branch (24.2) that leads from the second fuel pump (12) to the second fuel distribution strip (22).

8. The fuel delivery system according to claim 4, in which the high-pressure line (24) is split into a first high-pressure line branch (24.1) that leads from the second fuel pump (12) to the first fuel distribution strip (21), and a second high-pressure line branch (24.2) that leads from the second fuel pump (12) to the second fuel distribution strip (22).

9. The fuel delivery system according to claim 5, in which the second high-pressure line branch (24.2) is a same length as the first high-pressure line branch (24.1).

10. The fuel delivery system according to claim 6, in which the second high-pressure line branch (24.2) is a same length as the first high-pressure line branch (24.1).

11. The fuel delivery system according to claim 7, in which the second high-pressure line branch (24.2) is a same length as the first high-pressure line branch (24.1).

12. The fuel delivery system according to claim 8, in which the second high-pressure line branch (24.2) is a same length as the first high-pressure line branch (24.1).

13. The fuel delivery system according to claim 5, in which the high-pressure line (24) splits into the two high-pressure line branches (24.1, 24.2) downstream, soon after the second fuel pump (12).

14. The fuel delivery system according to claim 9, in which the high-pressure line (24) splits into the two high-pressure line branches (24.1, 24.2) downstream, soon after the second fuel pump (12).

15. The fuel delivery system according to claim 5, in which the high-pressure line (24) splits into the two high-pressure line branches (24.1, 24.2) inside a housing surrounding the second fuel pump (12).

16. The fuel delivery system according to claim 13, in which the high-pressure line (24) splits into the two high-pressure line branches (24.1, 24.2) inside a housing surrounding the second fuel pump (12).

17. The fuel delivery system according to claim 1, in which the pressure control valve (30) is flange-mounted to the first fuel distribution strip (21).

18. The fuel delivery system according to claim 2, in which the pressure control valve (30) is flange-mounted to the first fuel distribution strip (21).

19. The fuel delivery system according to claim 1, in which the pressure control valve (30) is integrated into the first fuel distribution strip (21).

20. The fuel delivery system according to claim 1, in which the high-pressure line (24, 24.1, 24.2) is made of a dimensionally stable material of metal.

* * * * *